United States Patent [19]
Mills

[11] Patent Number: 6,064,789
[45] Date of Patent: May 16, 2000

[54] OPTICAL FIBER RIBBON PRINTING FOR CONTROLLED DELTA ATTENUATION

[75] Inventor: Gregory A. Mills, Claremont, N.C.

[73] Assignee: Siecor Operations, LLC, Hickory, N.C.

[21] Appl. No.: 09/039,687

[22] Filed: Mar. 16, 1998

[51] Int. Cl.⁷ .................................................. G02B 6/44
[52] U.S. Cl. .......................................... 385/114; 385/100
[58] Field of Search ..................................... 385/100, 114

[56] References Cited

U.S. PATENT DOCUMENTS

| | | | |
|---|---|---|---|
| 3,833,891 | 9/1974 | Howard et al. | 340/172.5 |
| 4,147,407 | 4/1979 | Eichenbaum et al. | 350/96.34 |
| 4,370,542 | 1/1983 | Mills et al. | 219/121 |
| 4,371,274 | 2/1983 | Jaeger | 400/121 |
| 4,848,868 | 7/1989 | Rohner | 350/96.23 |
| 5,119,464 | 6/1992 | Freychet et al. | 385/147 |
| 5,121,133 | 6/1992 | Chiang | 346/1.1 |
| 5,214,730 | 5/1993 | Nagasawa | 385/59 |
| 5,223,062 | 6/1993 | Tanihira et al. | 156/55 |
| 5,379,363 | 1/1995 | Bonicel et al. | 385/114 |
| 5,446,821 | 8/1995 | Nonaka et al. | 385/128 |
| 5,485,539 | 1/1996 | Mills | 385/114 |
| 5,809,195 | 9/1998 | Brown et al. | 385/114 |

FOREIGN PATENT DOCUMENTS

| | | | |
|---|---|---|---|
| 09043465 | 2/1997 | Japan | G02B 6/44 |
| 1 236 438 | 10/1968 | United Kingdom . | |
| 1 432 548 | 8/1972 | United Kingdom . | |

OTHER PUBLICATIONS

Wiedenbach Apparatebau GmbH; Technical Description and Product Information no date.

Videojet Systems International, Inc; The Basics of Better Product Marking & Coding; BB–191–10M no date.

Videojet EXCEL Series 270I Dual Printhead Ink Jet Printer product information no date.

Videojet EXCEL HR High Resolution Ink Jet Printer product information no date.

Videojet EXCEL Series 100 print samples no date.

*Primary Examiner*—Rodney Bovernick
*Assistant Examiner*—Benjamin Cushwa
*Attorney, Agent, or Firm*—Timothy J. Aberle

[57] ABSTRACT

An optical ribbon (20) includes optical fibers (28) encased in a ribbon common layer (21). Ribbon common layer (21) is printed with ink dots (23) such that ample spacing between dots (23), and controlled print spacing intervals, reduce delta attenuation.

50 Claims, 8 Drawing Sheets

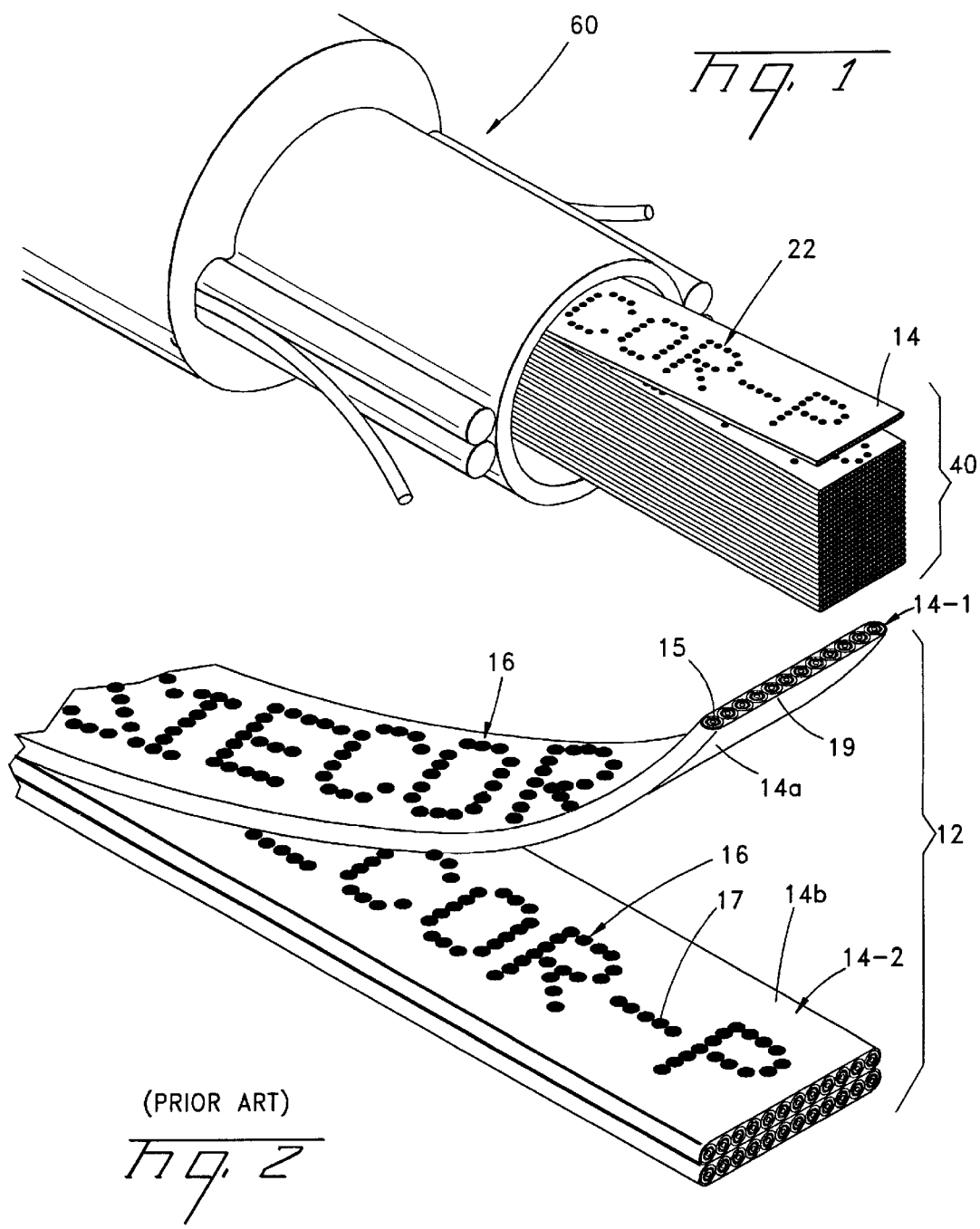

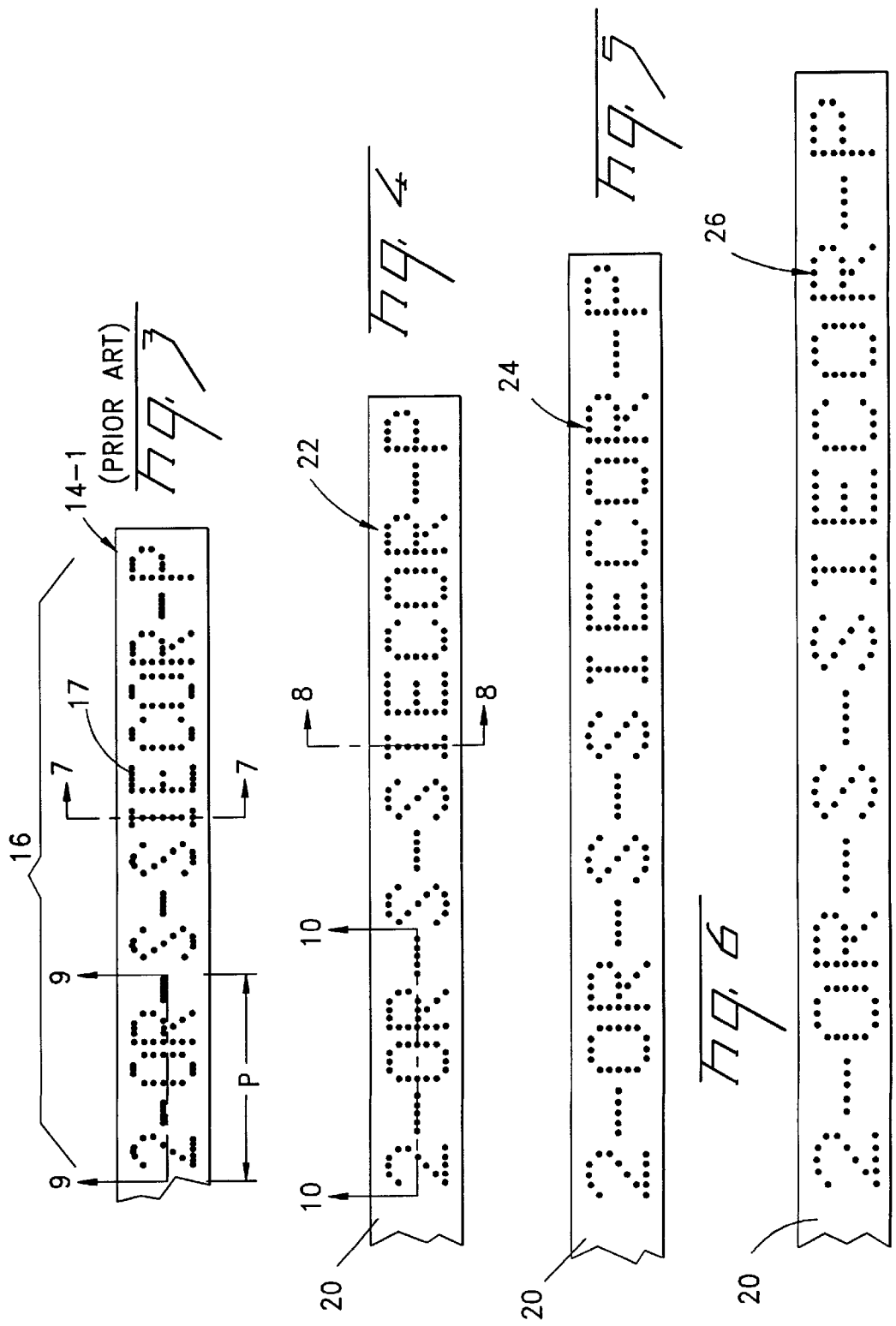

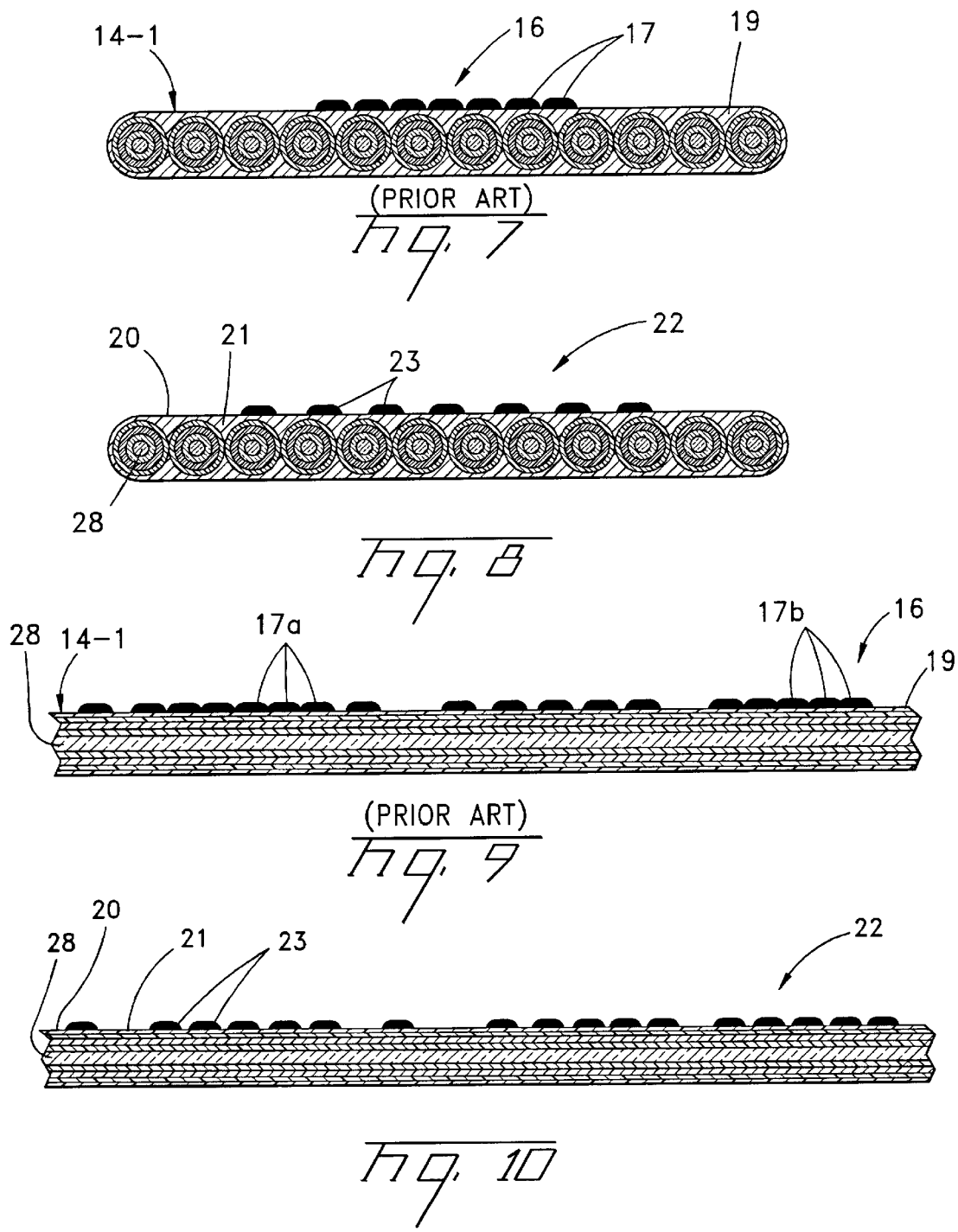

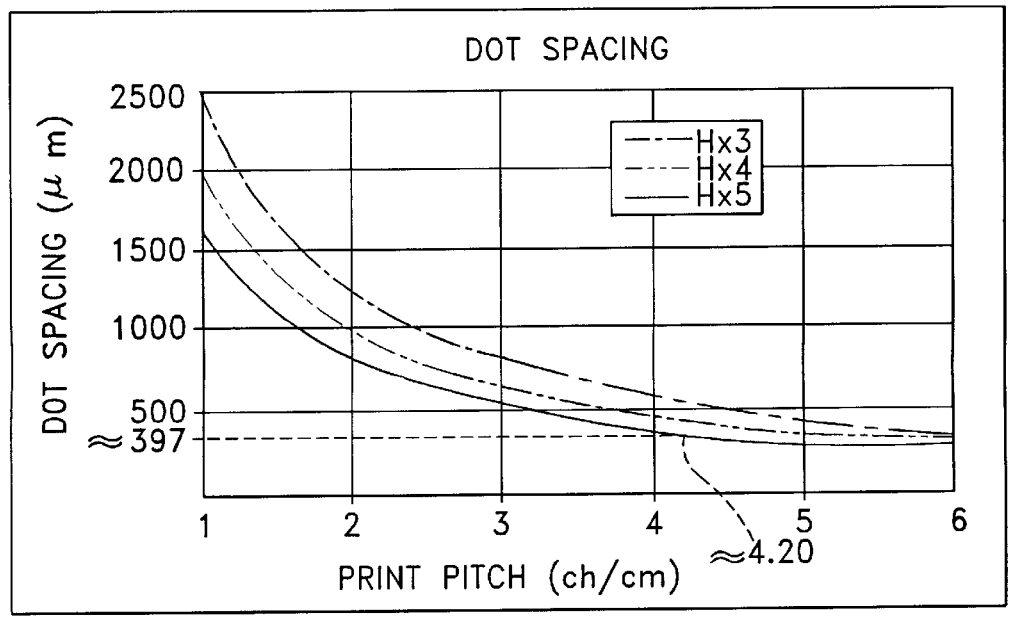
Fig. 18
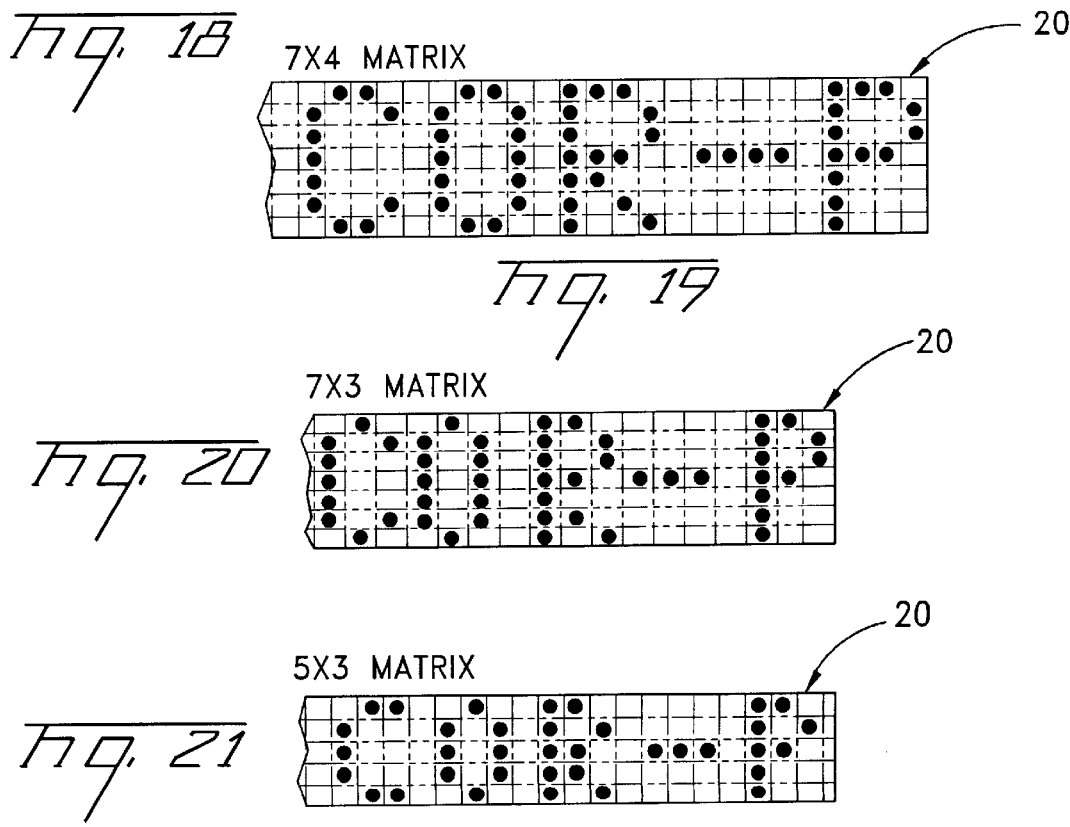
Fig. 19
Fig. 20
Fig. 21

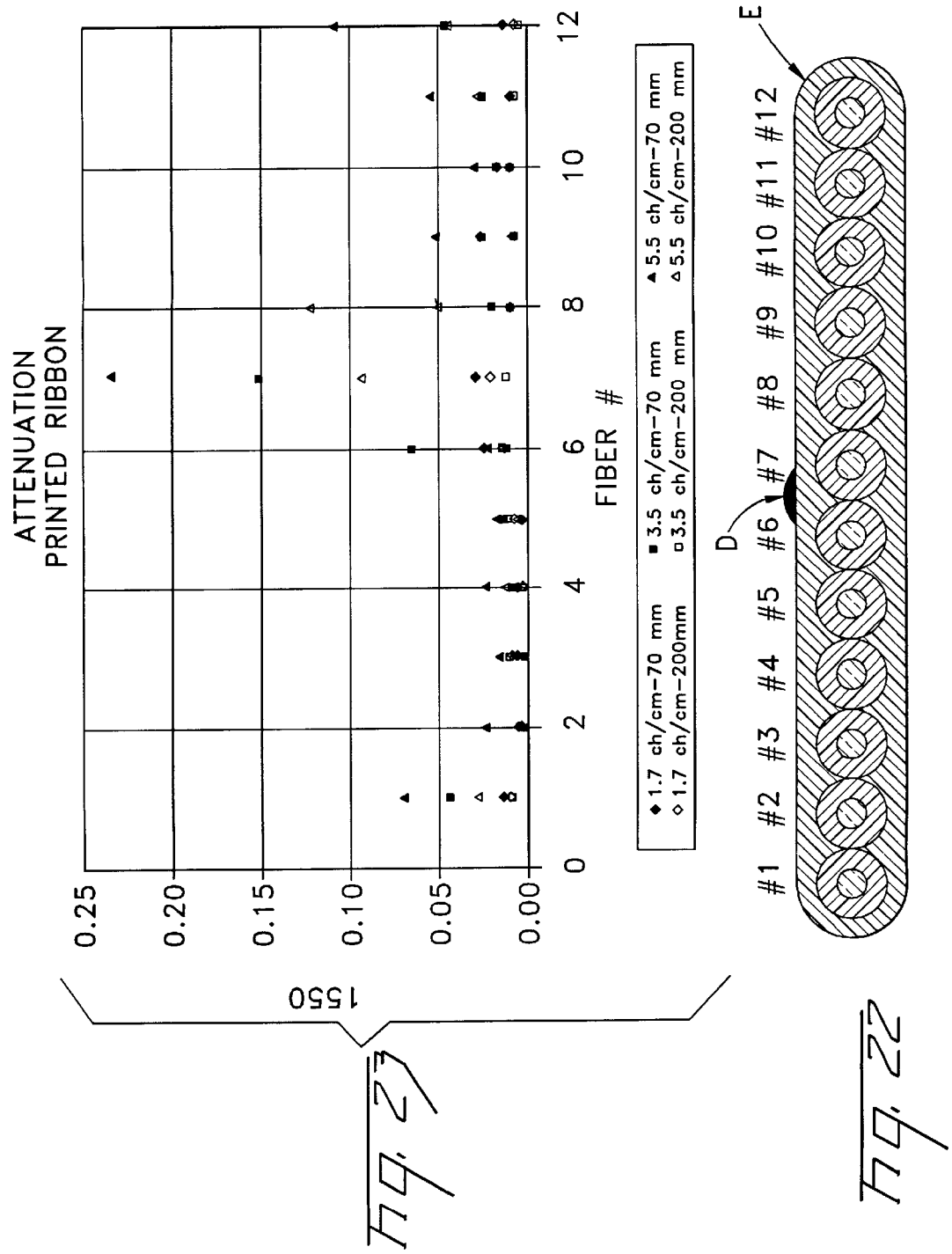

OPTICAL FIBER RIBBON PRINTING FOR CONTROLLED DELTA ATTENUATION

The present invention relates to an optical ribbon and, more particularly, to an optical fiber ribbon with an indicia printed thereon.

Conventional fiber optic cables comprise optical fibers that conduct light which is used to transmit voice, video, and data information. An optical ribbon includes a group of optical fibers that are coated with a ribbon common layer, which common layer may be of the ultraviolet (UV) light curable type. Typically, such a ribbon common layer is extruded about a group of optical fibers that have been arranged in a planar array, and is then irradiated with a UV light source which cures the ribbon common layer. The cured ribbon common layer protects the optical fibers and generally aligns the respective positions of optical fibers in the planar array.

FIG. 2 shows adjacent optical ribbons 14-1 and 14-2 of a known ribbon stack. Optical ribbon 14-1, 14-2 each include optical fibers 15 encased in a ribbon common layer 19. A craftsman may gain access to optical ribbons 14-1, 14-2 by cutting away outer portions of the cable to expose ribbon stack 12. Once stack 12 is exposed, the craftsman may desire to distinguish between and classify the ribbons according to, for example, which telecommunications circuit they are to be associated with. To classify the ribbons, the craftsman may look for indicias on each ribbon, for example, a series of alpha-numeric characters which define a label or indicia 16. As shown in FIG. 3, indicia 16 include a series of printed dots 17 which depict alpha-numeric characters. Dots 17 are small masses of ink material which present bump-like (FIG. 7) and/or trough-like (not shown) irregularities on and/or in the surface of common layer 19. The characters of indicia 16 are made at a conventional print pitch P of about 4.21 to 5.5 characters per centimeter (ch/cm). Indicias 16 are typically repeated longitudinally on the ribbon at print spacing intervals. A typical print spacing is about 150–200 mm and above. Print spacing as shown in a longitudinal cross section of ribbon 14-1 (FIG. 9), a 5.5 ch/cm print pitch results in dots 17a of indicia 16 very nearly touching, and dots 17b being overlapped to some extent. Rather than discrete dots, dots 17a, 17b may in some places form lines. Where ribbons 14-1, 14-2 include essentially permanent indicias 16, the craftsman's ribbon classification task may be done with ease and reliability. Indicias 16 may therefore be essentially permanent, i.e., robust enough to withstand abrasion or overcoated with an anti-abrasion layer.

Known ribbon indicia of the printed ink type may be printed on the ribbon common layer or on optical fibers. U.S. Pat. No. 5,485,539 discloses printed ink dots on a ribbon common layer that define layered dots that form symbols. A transparent, anti-abrasion coating may be applied over the printed ink dots.

U.S. Pat. No. 5,119,464 discloses a process for directly marking optical fibers with ink as they move in a planar array before being coated with a protective envelope. An ink jet sprays the optical fibers with ink as the fibers move along a production line. The ink jet is driven to reciprocate in a direction that is transverse to the direction of movement of the fibers along the production line. As this occurs, bands of ink are deposited on the optical fibers. The bands of ink are staggered with respect to each other across the array of optical fibers. The result is a group of optical fibers each having a characteristic ink band spacing.

The foregoing disclosures do not teach or suggest a cognizance of any relationship between the printed indicia and attenuation loss in the optical fibers. Attenuation indicates a degradation in performance due to a loss in power from one point to another along a light waveguide path, e.g., an optical fiber. Attenuation is generally measured in terms of decibels per kilometer (dB/km) at a specified wavelength. Attenuation varies with the wavelength of light propagating through the optical fiber. A delta attenuation is the change in attenuation that a modified optical fiber experiences as measured relative to a reference attenuation measurement of the optical fiber in a pre-modified state. For example, delta attenuation is a measure of the increase in attenuation a colored optical fiber experiences as compared to the attenuation the optical fiber experienced without the coloring layer. Since increases in attenuation degrade the performance of an optical fiber, high delta attenuations are undesirable. Attenuation may be caused by microbending or macrobending of the optical fiber. A microbend loss may result from the optical fiber passing over small bumps. Optical fibers have windows of low-loss wavelength regions where the fiber will carry light with little attenuation. One of the windows is known as a 1310 nm wavelength region, and another is in the 1550 nm wavelength region.

As noted above, delta attenuation may exist in colored optical fibers. U.S. Pat. No. 5,446,821 describes the problem of attenuation loss in a colored optical fiber exposed to a high humidity environment. The colored ink is an extruded mixture composed of a reactive diluent, an initiator, a pigment, and a sensitizer. The sensitizer is operative to increase the curing speed of the ink, but it may absorb water post-cure and cause the formation of sections of localized swelling in the colored ink. The sections of localized swelling result in pockets of stress that cause microbending losses. The solution to the problem is the use of a colored ink having a sensitizer chosen for its low water absorption and low water solubility characteristics.

OBJECTS OF THE INVENTION

It is an object of the invention to provide an optical ribbon comprising a ribbon common layer which encases optical fibers, the common layer including at least one indicia thereon, the at least one indicia including a print pitch of below about 4.21 ch/cm, whereby delta attenuation of the optical fibers is below a predetermined value.

It is another object of the invention to provide a stack of optical ribbons for use in a fiber optic cable wherein at least one of the optical ribbons includes at least one indicia, the at least one indicia including a print pitch which effects delta attenuation of optical fibers in the at least one ribbon and an adjacent optical ribbon of the stack, the print pitch controlling the delta attenuation below a predetermined value.

It is an object of the invention to provide an optical ribbon, comprising a ribbon common layer which encases optical fibers, the ribbon common layer including at least one indicia thereon, the at least one indicia includes a dot matrix format of H×4 and a print pitch of below about 5 ch/cm for reducing delta attenuation of the optical fibers.

It is an object of the invention to provide an optical ribbon with a ribbon common layer which encases optical fibers, the common layer including at least one indicia thereon, the at least one indicia including a dot matrix format of H×3 and a print pitch of below about 6 ch/cm for reducing delta attenuation of the optical fibers.

It is an object of the invention to provide a method of printing an optical ribbon, comprising the step of using a printing apparatus to print a ribbon common layer with ink dots so that the ink dots form at least one indicia, a dot-to-dot spacing of said indicia above about 397 µm.

BRIEF DESCRIPTION OF THE DRAWING FIGURES

FIG. 1 is an isometric view of a fiber optic cable according to the present invention.

FIG. 2 is an enlarged view of known optical ribbons.

FIG. 3 is schematic view of an indicia printed on at least one of the optical ribbons of FIG. 2.

FIG. 4 is a schematic view of an indicia printed on an optical ribbon according to the present invention.

FIG. 5 is a schematic view of an indicia printed on an optical ribbon according to the present invention.

FIG. 6 is a schematic view of an indicia printed on an optical ribbon according to the present invention.

FIG. 7 is a transverse cross section of the known optical ribbon of FIG. 3.

FIG. 8 is a transverse cross section of the optical ribbon of FIG. 4.

FIG. 9 is a longitudinal cross section of the known optical ribbon of FIG. 3.

FIG. 10 is a longitudinal cross section of the optical ribbon of FIG. 4.

FIG. 18 is a graph of three curves of dot spacing as a function of print pitch for dot matrices of various heights having widths of 3, 4, and 5 dots corresponding to the three curves.

FIG. 19 is a schematic view of an optical ribbon according to the present invention having a 7×4 dot matrix.

FIG. 20 is a schematic view of an optical ribbon according to the present invention having a 7×3 dot matrix.

FIG. 21 is a schematic view of an optical ribbon according to the present invention having a 5×3 dot matrix.

FIG. 23 is a graph of fiber number versus delta attenuation at 1550 nm.

FIG. 24 is a graph of fiber number versus delta attenuation at 1310 nm.

DETAILED DESCRIPTION OF THE INVENTION

Figure 11:
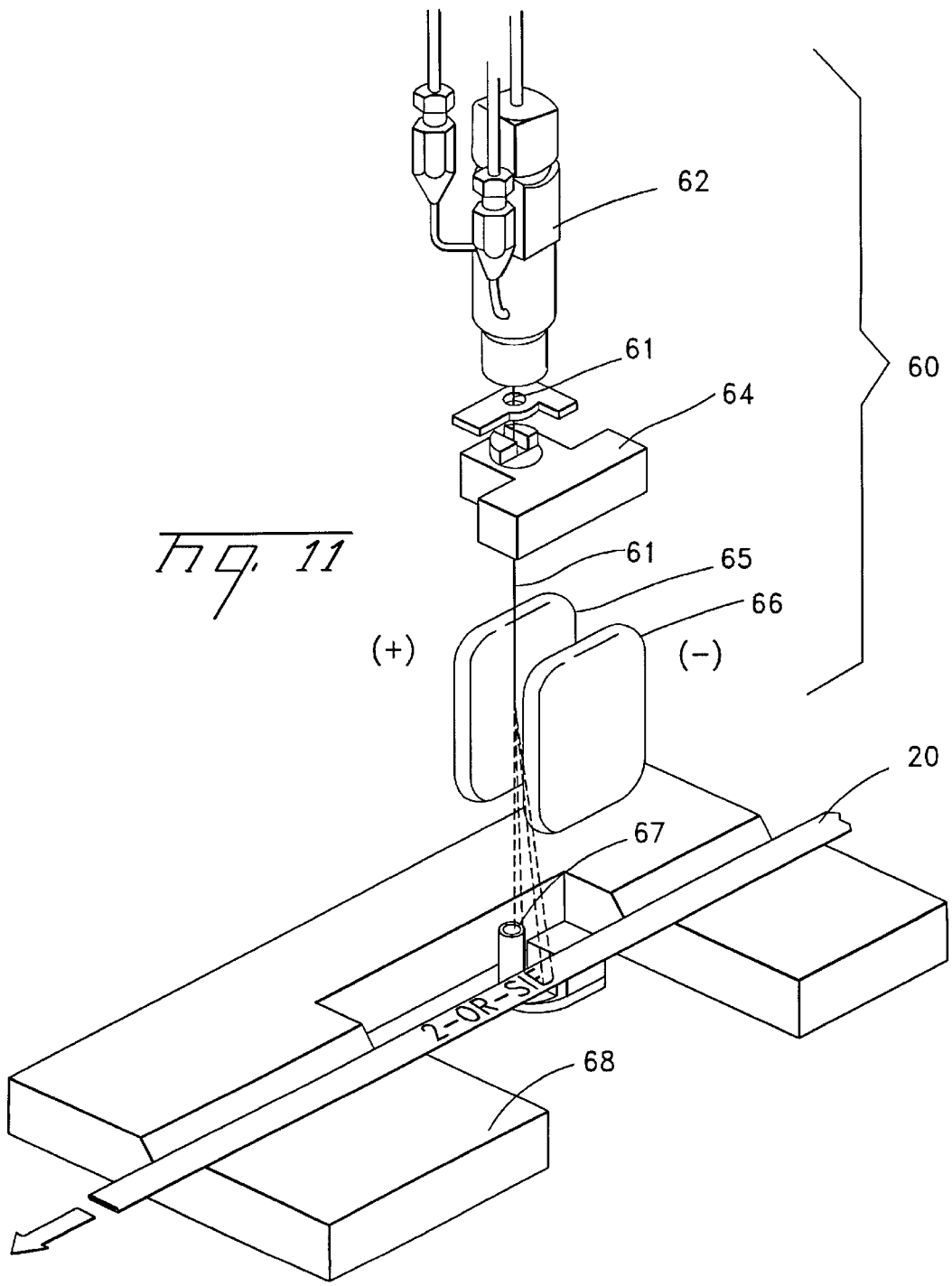
FIG. 11 is an isometric view of a conventional apparatus suitable for use with the present invention.

An embodiment of present invention includes a stack of optical ribbons having symbols printed on the optical ribbons whereby delta attenuation in the optical ribbons is reduced below a predetermined value. The inventor of the present invention has discovered a synergistic relationship between printed indicia and delta attenuation, namely, that an optical ribbon comprising a printed indicia experiences significant delta attenuation caused by the indicia printed thereon, and the printed indicia may collaterally result in an increased delta attenuation of an adjacent optical ribbon in contact with the indicia on the printed ribbon.

FIG. 2 shows indicia 16 printed on a ribbon surface 14b of ribbon 14-2 located directly beneath an adjacent optical ribbon 14-1 having a surface 14a. When ribbons 14-1, 14-2 are arranged in a ribbon stack, surface 14a of ribbon 14-1 will generally contact surface 14b of flanking ribbon 14-2. The printing of indicia 16 on common layer 19 of ribbon 14-1 is believed to create microbending in optical fibers 15 thereof. Additionally, the pressing of indicia 16 of ribbon 14-2 on surface 14a of ribbon 14-1, for example as a result of a helical stranding of the ribbon stack, is believed to create localized stress points in ribbon common layer 19 of ribbon 14-1. In other words, an optical ribbon may experience microbending losses due to direct and flanking printed indicia. As the optical ribbons each include indicia printed directly thereon, and the printed ribbons are flanked by at least one other printed indicia, and when viewing the delta attenuations of the ribbon stack in the aggregate over many kilometers of cable, the overall performance of ribbon stack 12 may be significantly affected by indicia 16.

Figure 22:
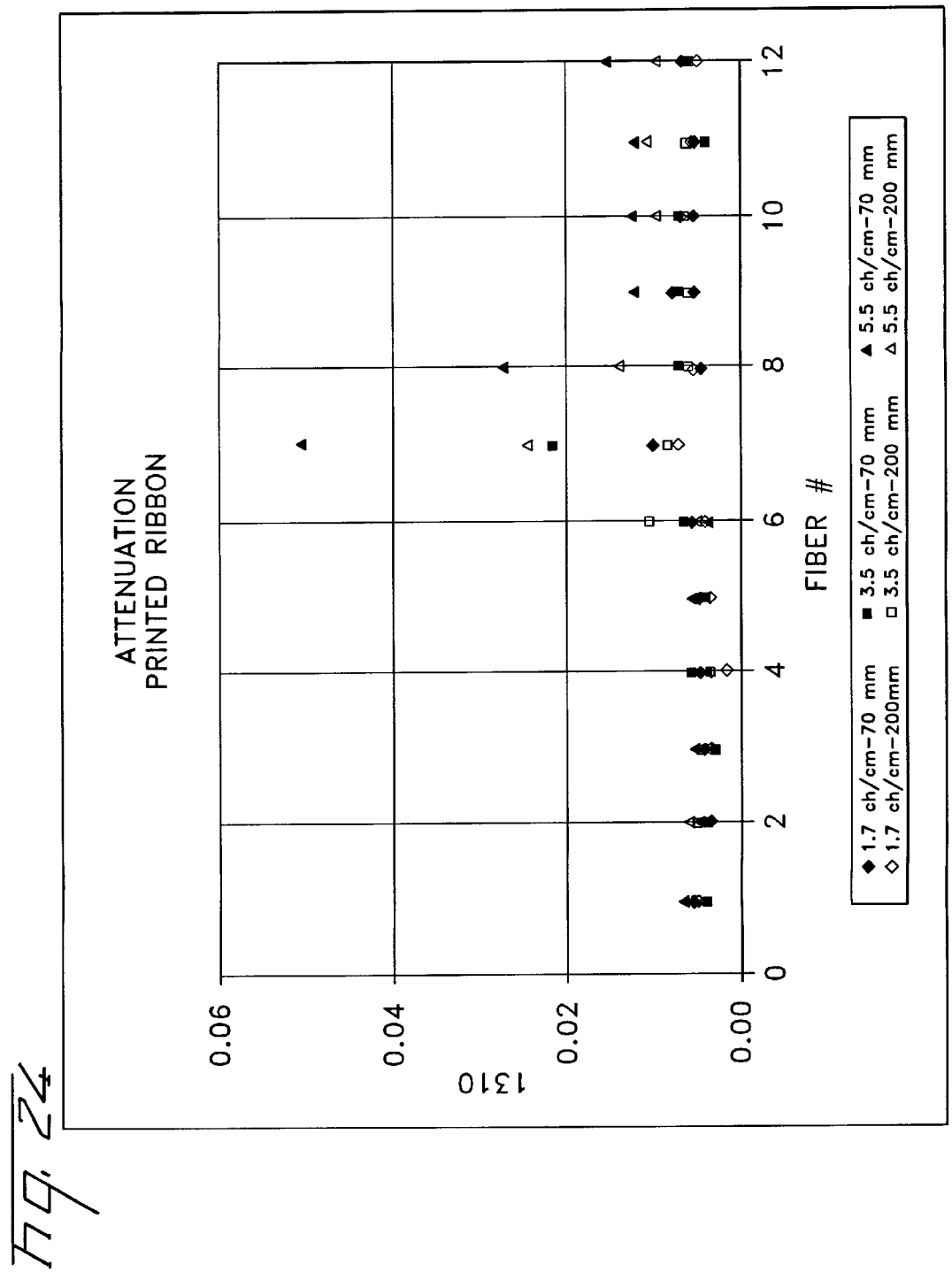
FIG. 22 is a cross section of an optical ribbon used in an experiment of the instant invention.

Experimental data underpin the inventive principles developed herein. FIGS. 12–17 and 23–24 represent the effect of a printed indicia on the respective delta attentions of optical fibers in a simulated stack of optical ribbons. In the experiment, 12-fiber optical ribbons E (FIG. 22) were printed with a respective indicia D that included a series of dots representing dash-like symbols. Dots of indicia D very nearly touched or were overlapped to some extent so that, rather than resembling discrete ink dots, the nearly touching or overlapped dots in some places formed lines of ink. The print pitch of indicia D was varied for each ribbon E from 1.7 ch/cm to 5.5 ch/cm, and the print spacing was varied from 70 mm to 200 mm. Each optical fiber was a single mode type with a mode field diameter (MFD) of 8.95 or 9.3 measured at 1310 nm. Fibers #1–#6 (FIG. 22) were 8.95 MFD fibers, and fibers #7–#12 were 9.3 MFD fibers. After printing of indicia D, optical ribbons were wound on a drum and the delta attenuations for each of fiber sets #1–#6 and #7–#12 was measured at wavelengths of 1550 nm (FIG. 23) and 1310 nm (FIG. 24), twenty-four hours after printing. Average delta attenuations were then calculated for each fiber set and plotted, as described below with reference to FIGS. 12–17.

Figure 12:
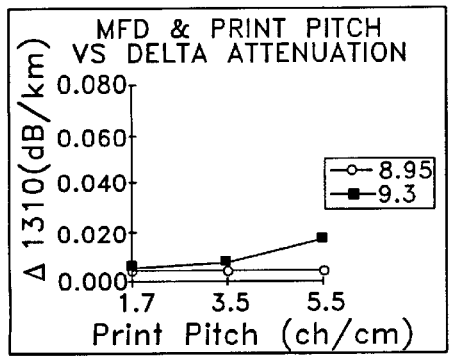
FIG. 12 is a graph of mode field diameter and print pitch versus delta attenuation.
Figure 13:
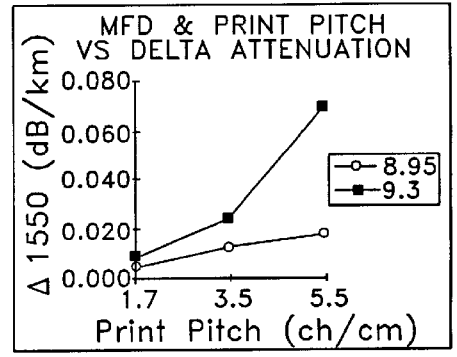
FIG. 13 is a graph of mode field diameter and print pitch versus delta attenuation.
Figure 14:
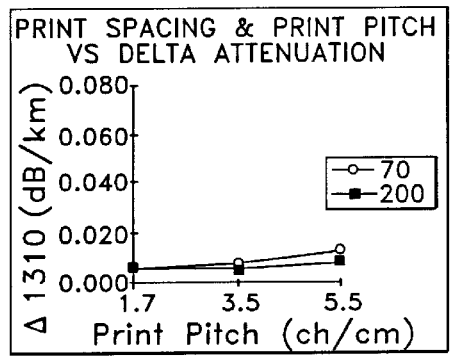
FIG. 14 is a graph of print spacing and print pitch versus delta attenuation.
Figure 15:
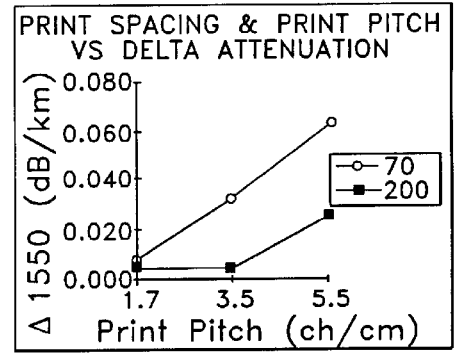
FIG. 15 is a graph of print spacing and print pitch versus delta attenuation.
Figure 16:
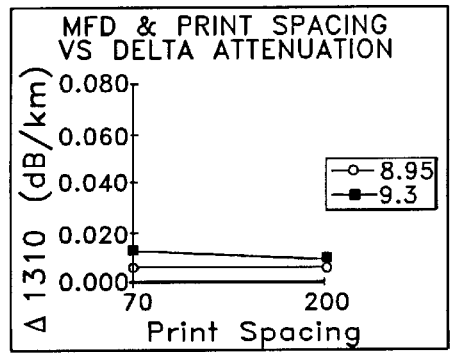
FIG. 16 is a graph of mode field diameter and print spacing versus delta attenuation.
Figure 17:
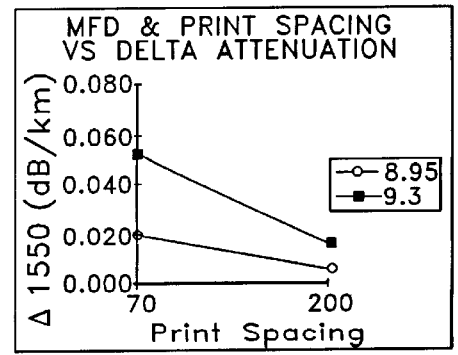
FIG. 17 is a graph of mode field diameter and print spacing versus delta attenuation.

Each data point shown in FIGS. 12–17 represents an average delta attenuation for a particular fiber set in which the 1310 nm and 1550 nm wavelengths were applied. FIGS. 12–13 are graphs of delta attenuation as a function of print pitch for the two fibers with mode field diameters of 8.95 and 9.3 $\mu$m. The data indicates that reducing the print pitch from 5.5 ch/cm to 1.7 ch/cm reduces the delta attenuation for each type of optical fiber at the specified wavelengths. FIGS. 14–15 are graphs of delta attenuation as a function of print pitch where the print spacing was varied from 70 mm to 200 mm. The data indicates that increasing the print spacing from 70 mm to 200 mm reduces delta attenuation. FIGS. 16–17 are graphs of delta attenuation as a function of print spacing for the two fibers with mode field diameters of 8.95 and 9.3 $\mu$m. The data indicates that delta attenuation is higher with smaller print spacing and mode field diameter. An optical ribbon E with a 200 mm print spacing and a print pitch of 1.7 ch/cm yielded the lowest average delta attenuations, while a ribbon E having a 70 mm print spacing and a print pitch of 5.5 ch/cm resulted in a relatively higher, i.e., less desirable, average delta attenuations.

The foregoing data suggest, for example, that a lower print pitch results in a lower delta attenuation. Delta attenuation is higher with smaller print spacing and/or larger print pitch for optical ribbons taken individually or in a stack. Print pitch and dot spacing are inversely proportional (FIG. 18). A printed ribbon will experience microbending due to the printed indicia thereon, and it may experience microbending from a collateral source, i.e., the pressing of the printed indicia of a flanking optical ribbon. Moreover, it has been discovered that when print spacing is decreased and the print pitch is increased, an optical fiber with a relatively large mode field diameter (MFD) will experience a larger delta attenuation increase than an optical fiber with a relatively smaller MFD.

Optical ribbons 20 made in accordance with the inventive principles noted above, and a method of printing on the same, are described with reference to FIGS. 4–6, 8, 10–11, and 19–21. Optical ribbons 20 form a ribbon stack 40 in a fiber optic cable 60 (FIG. 1). Each optical ribbon 20 (FIG. 8) may include a plurality of planarly arranged, typically single mode optical fibers 28 having a MFD of, e.g., 8.95 or 9.3. Optical fibers 28 are encased in a ribbon common layer 21 formed of, for example, a UV curable acrylate material. Ribbon 20 has a nominal thickness of 175–400 $\mu$m with optical fibers having a nominal OD of about 155–255 $\mu$m. Common layer 21 is printed with ink dots 23 which depict symbols that are, according to the present invention, arranged at a print pitch within the range of about 1.7 ch/cm to below about 4.2 ch/cm. Delta attenuation is below a predetermined value of about 0.060 dB/km. More preferably, the predetermined value is below about 0.040 dB/km, and most preferably it is below about 0.020 dB/km. Examples of inventive optical ribbons having indicias printed thereon at a suitable print pitch comprise an indicia 22 with a print pitch of about 4.0 ch/cm (FIGS. 4, 8, and 10), an indicia 24 with a print pitch of about 3.5 ch/cm (FIG. 5), an indicia 26 with a print pitch of about 3.0 ch/cm (FIG. 6), and an indicia with a print pitch of about 1.7 ch/cm (not shown).

FIGS. 8 and 10 respectively show transverse and longitudinal cross sections of ribbon 20 with indicia 22 thereon. Indicia 22 include intervals of non-printed portions of common layer 21, between adjacent ink dots 23 (FIGS. 8 and 10), which intervals are generally greater than the intervals of non-printed portions of common layer 19, i.e., between adjacent ink dots 17 (Prior Art FIGS. 7 and 9). Ink dots 23, in accordance with the inventive principles noted above, are spaced apart so that they do not very nearly touch, and dots 23 are substantially not overlapped. In other words, a print pitch of below about 4.21 ch/cm will result in larger dot-to-dot spacings on the ribbon (FIG. 18), and decreased delta attenuation of optical fibers 28.

Preferred print spacings between label, or indicias 16 for achieving low delta attenuations according to the present invention are about 70 mm, 100 mm, 200 mm or above. Preferred dot diameter and height ranges are about 350–450 $\mu$m and less than 2 $\mu$m, respectively. The dot diameter and height may be controlled by varying the viscosity and density of the ink and the size of the ink nozzle. Preferably, the dot-to-dot spacing is greater than the dot diameter. According to the present invention, a preferred density of the ink is less than about 0.85 g/cm$^3$ and, more preferably, the density is less than about 0.845 g/cm$^3$. A commercially available ink with a density of about 0.865/cm$^3$ may be modified by reducing the solids of the ink content to obtain a suitable density.

The present invention contemplates the use of various dot matrix formats. A preferred dot matrix format is 7 dots high (H) by 5 dots wide, i.e., 7×5, as shown by indicias 2,24,26 of FIGS. 4–6. However, dot matrix formats of 7×4, 7×3, or 5×3 as shown in FIGS. 19–21, respectively, having suitable print pitches and print spacing in accordance with the inventive principles of the present invention, may be used as well. FIG. 18 illustrates the relationship between dot spacing ($\mu$m) and print pitch (ch/cm). H×3, H×4, and H×5 dot matrix format curves are plotted and show that print pitch and dot spacing are inversely proportional. A preferred dot spacing for an H×5 dot matrix format, e.g. the 7×5 dot matrices of indicias 22,24,26, is below about 4.21, which roughly corresponds to a dot spacing above about 397 $\mu$m. More specifically, with reference to FIG. 18, the 4.0 ch/cm print pitch of indicia 22 (FIGS. 4, 8, and 10) corresponds to a dot spacing of about 415 $\mu$m. The print pitch of about 3.5 ch/cm of indicia 24 (FIG. 5) corresponds to a dot spacing of about 475 $\mu$m. The print pitch of about 3.0 ch/cm of indicia 26 (FIG. 6) corresponds to a dot spacing of about 555 $\mu$m. Indicia with a print pitch of about 1.7 ch/cm (not shown) correspond to a dot spacing of about 980 $\mu$m. Moreover, it is believed that a dot matrix format of H×4 having a print pitch of below about 5 ch/cm, or an H×3 format below about 6 ch/cm, for example, in accordance with the inventive principles of the present invention, may be used in order to achieve low delta attenuation, for example, below a predetermined value of about 0.060 dB/km.

Referring to FIG. 11, a printing process utilizing a printing apparatus 60 for printing a ribbon 20 having a print pitch and print spacing according to the present invention will be described. Printing apparatus 60 includes a nozzle 62, a charging electrode 64, deflector plates 65,66 which are connected to a high voltage, and a recirculation tube 67. Ribbon 20 moves through a print station 68 below apparatus 60 as an ink jet 61 of conductive ink is sprayed from nozzle 62 in the form of ink drops. The drops that are required to create the printed symbols on ribbon 20 are electrostatically charged by applying a pulsed voltage between charging electrode 64 and nozzle 62 thereby causing an ion shift in certain ones of the ink drops. All drops cross an electrical field between deflector plates 65,66, but only the charged drops are deflected by the electrical field onto ribbon 20. Uncharged drops go into recirculation tube 67 and are reused in the ink circuit. Based on the magnitude of their respective charges, the charged drops are deflected to different degrees by the electrical field between deflector plates 65,66. Ribbon 20 is marked with a print pitch and print spacing according to the present invention as ribbon 20 moves at print station 68. Control settings of printing apparatus 60 are preferably such that, in accordance with the relationship between dot spacing and print pitch noted above (FIG. 18), decreasing the print pitch will increase the dot-to-dot spacing of the ink applied to ribbon 20. Control settings of printing apparatus 60 preferably include variable print spacing of at least 70 mm and above, variable dot height and variable dot size within the ranges noted above.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims. For example, all or some of the indicia according to the present invention may be overcoated with a protective layer, for example, as disclosed in U.S. Pat. No. 5,485,539, which is hereby incorporated by reference in its entirety. Additionally, although single mode optical fibers having a MFD at 1310 nm of 8.95 or 9.3 have been described, multi-mode optical fibers and other single mode optical fibers having other MFDs may be used as well. Moreover, multi-mode fibers may be used. Although the embodiments are directed to a dot matrix format, the invention may be adapted for use with double stroke, stylized, or custom symbols within the scope of the appended claims.

Accordingly, what is claimed is:

1. An optical ribbon, comprising:
a ribbon common layer which encases optical fibers, said common layer including at least one indicia thereon, said at least one indicia having a print pitch of below about 4.20 ch/cm, whereby delta attenuation of said optical fibers is below a predetermined value of about 0.060 dB/km.

2. The optical ribbon of claim 1, wherein said print pitch is about 4.0 ch/cm to about below about 4.21 ch/cm.

3. The optical ribbon of claim 1, wherein said print pitch is about 3.5 ch/cm to about 4.0 ch/cm.

4. The optical ribbon of claim 1, wherein said print pitch is about 1.7 ch/cm to about 3.5 ch/cm.

5. The optical ribbon of claim 1, wherein said ribbon includes at least two of said indicia, said indicia spaced apart at a print spacing of 70 mm or more.

6. The optical ribbon of claim 1, wherein said ribbon includes at least two of said indicia, said indicia spaced apart at a print spacing of 100 mm or more.

7. The optical ribbon of claim 1, wherein said ribbon includes at least two of said indicia, said indicia spaced apart at a print spacing of at least about 200 mm.

8. The optical ribbon of claim 1, wherein the nominal thickness of said optical ribbon is about 250 $\mu$m or above.

9. The optical ribbon of claim 1, wherein said indicia comprises dots formed by conductive ink.

10. The optical ribbon of claim 1, wherein symbols of said indicia are in an H×5 dot matrix format.

11. The optical ribbon of claim 1, wherein symbols of said indicia are in an H×4 dot matrix format.

12. The optical ribbon of claim 1, wherein symbols of said indicia are in an H×3 dot matrix format.

13. The optical ribbon of claim 1, wherein said predetermined value is below about 0.04 dB/km.

14. The optical ribbon of claim 1, wherein said predetermined value is below about 0.020 dB/km.

15. The optical ribbon of claim 1, wherein a dot-to-dot spacing of said indicia is above about 397 $\mu$m.

16. The optical ribbon of claim 1, wherein a dot-to-dot spacing of said indicia is above about 411 $\mu$m.

17. A stack of optical ribbons for use in a fiber optic cable, comprising:
at least one of said optical ribbons includes at least one printed ink indicia, said at least one indicia comprising a print pitch which effects delta attenuation of optical fibers in said at least one ribbon and an adjacent optical ribbon of said stack, said print pitch reducing said delta attenuation below a predetermined value of about 0.060 dB/km.

18. The stack of optical ribbons of claim 17, wherein said print pitch is about 4.0 ch/cm to below about 4.21 ch/cm.

19. The stack of optical ribbons of claim 17, wherein said print pitch is about 3.5 ch/cm to about 4.0 ch/cm.

20. The stack of optical ribbons of claim 17, wherein said print pitch is about 1.7 ch/cm to about 3.5 ch/cm.

21. The stack of optical ribbons of claim 17, wherein said ribbon includes at least two of said indicias, said indicias spaced apart at a print spacing of at least about 70 mm.

22. The stack of optical ribbons of claim 17, wherein said ribbon includes at least two of said indicias, said indicias spaced apart at a print spacing of at least about 100 mm.

23. The stack of optical ribbons of claim 17, wherein said ribbon includes at least two of said indicias, said indicias spaced apart at a print spacing of at least about 200 mm.

24. The stack of optical ribbons of claim 17, wherein said at least one optical ribbon has a nominal thickness of about 250 gm or above.

25. The stack of optical ribbons of claim 17, wherein symbols of said indicia are in an H×5 dot matrix format.

26. The stack of optical ribbons of claim 17, wherein symbols of said indicia are in an H×4 dot matrix format.

27. The stack of optical ribbons of claim 17, wherein symbols of said indicia are in an H×3 dot matrix format.

28. The stack of optical ribbons of claim 17, wherein at least some of the optical fibers in said optical ribbons have a MFD of at least 8.95.

29. The stack of optical ribbons of claim 17, wherein said predetermined value is below about 0.040 dB/km.

30. The stack of optical ribbons of claim 17, wherein said predetermined value below about 0.020 dB/km.

31. The stack of optical ribbons of claim 17, wherein a dot-to-dot spacing of said indicia is above about 397 $\mu$m.

32. The stack of optical ribbons of claim 17, wherein a dot-to-dot spacing of said indicia is above about 411 $\mu$m.

33. An optical ribbon, comprising:
a ribbon common layer which encases optical fibers, said common layer includes at least one indicia thereon, said at least one indicia includes a dot matrix format of H×4 and a print pitch of below about 5 ch/cm for effecting a delta attenuation of said optical fibers below a predetermined value of about 0.060 dB/km.

34. The optical ribbon of claim 33, wherein said ribbon includes at least two of said indicias, said indicias spaced apart at a print spacing of 70 mm or more.

35. The optical ribbon of claim 33, wherein a dot-to-dot spacing of said indicia is above about 397 $\mu$m.

36. The optical ribbon of claim 33, wherein a dot-to-dot spacing of said indicia is above about 411 $\mu$m.

37. An optical ribbon, comprising:
a ribbon common layer which encases optical fibers, said common layer includes at least one indicia thereon, said at least one indicia includes a dot matrix format of H×3 and a print pitch of below about 6 ch/cm for effecting a delta attenuation of said optical fibers below a predetermined value of about 0.060 dB/km.

38. The optical ribbon of claim 37, wherein said ribbon includes at least two of said indicias, said indicias spaced apart at a print spacing of 70 mm or more.

39. The optical ribbon of claim 37, wherein a dot-to-dot spacing of said indicia is above about 397 $\mu$m.

40. The optical ribbon of claim 37, wherein a dot-to-dot spacing of said indicia is above about 411 $\mu$m.

41. In a method of printing on an optical ribbon, comprising:
using a printing apparatus to print a ribbon common layer with ink dots so that said ink dots form at least one indicia, a dot-to-dot spacing of said indicia being above about 397 $\mu$m, said print pitch controlling said delta attenuation below a predetermined value of about 0.060 dB/km.

42. The method of claim 41, wherein said printing apparatus prints said print pitch below about 4.21 ch/cm.

43. The method of claim 41, wherein said printing apparatus prints said print pitch at or below about 3.5 ch/cm.

44. The method of claim 41, wherein said printing apparatus prints at least two indicias, said indicias spaced apart at a print spacing of 70 mm or more.

45. The method of claim 41, wherein said printing apparatus prints at least two indicias, said indicias spaced apart at a print spacing of 100 mm or more.

46. The method of claim 41, wherein said printing apparatus prints at least two indicias, said indicias spaced apart at a print spacing of at least about 200 mm.

47. The method of claim 41, wherein the nominal thickness of said ribbon is about 250–400 μm.

48. The method of claim 41, wherein symbols of said indicia are in an H×5 dot matrix format.

49. The method of claim 41, wherein symbols of said indicia are in an H×4 dot matrix format.

50. The method of claim 41, wherein symbols of said indicia are in an H×3 dot matrix format.

\* \* \* \* \*